(12) United States Patent
Lee et al.

(10) Patent No.: US 10,477,594 B2
(45) Date of Patent: Nov. 12, 2019

(54) APPARATUS AND METHOD FOR CONTROLLING SPEED OF TRANSMISSION LAYER IN WIRELESS COMMUNICATION SYSTEM

(71) Applicant: Samsung Electronics Co., Ltd., Gyeonggi-do (KR)

(72) Inventors: Hyung-Ho Lee, Seoul (KR); Jung-Shin Park, Seoul (KR); Joo-Hyung Lee, Gyeonggi-do (KR); Jin-Sung Lee, Seoul (KR); Han-Na Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 14/959,836

(22) Filed: Dec. 4, 2015

(65) Prior Publication Data

US 2016/0165646 A1 Jun. 9, 2016

(30) Foreign Application Priority Data

Dec. 5, 2014 (KR) .......................... 10-2014-0174236

(51) Int. Cl.
*H04W 76/10* (2018.01)
*H04L 12/26* (2006.01)
(Continued)

(52) U.S. Cl.
CPC ......... *H04W 76/10* (2018.02); *H04L 41/0896* (2013.01); *H04L 43/0811* (2013.01);
(Continued)

(58) Field of Classification Search
CPC .............................. H04W 76/10; H04W 76/12
(Continued)

(56) References Cited

U.S. PATENT DOCUMENTS 7,394,788 B2 7/2008 Kim et al.
7,616,644 B2 11/2009 Chaskar et al.
(Continued)

OTHER PUBLICATIONS

Kantola, R.; "Performance of Handover in Long Term Evolution" Aalto University; Nov. 1, 2011; 75 pages.
(Continued)

*Primary Examiner* — Chuck Huynh

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method for operating a proxy apparatus in a wireless communication system includes receiving a plurality of packets from a plurality of servers, and transmitting, to base station, data of one bearer data including the plurality of packets. A proxy apparatus in a wireless communication system includes a communication device configured to receive a plurality of packets from a plurality of servers, and transmit, to base station, data of one bearer including the plurality of packets. A base station apparatus in a wireless communication system includes a communication device configured to receive, from a proxy apparatus, data of one bearer including a plurality of packets.

24 Claims, 10 Drawing Sheets

(51) Int. Cl.
*H04L 29/06* (2006.01)
*H04W 36/00* (2009.01)
*H04L 12/70* (2013.01)
*H04L 12/24* (2006.01)
*H04W 76/12* (2018.01)
*H04L 29/08* (2006.01)
*H04W 88/18* (2009.01)
*H04W 76/11* (2018.01)

(52) U.S. Cl.
CPC ......... *H04L 43/0894* (2013.01); *H04L 47/00* (2013.01); *H04L 69/14* (2013.01); *H04W 36/0055* (2013.01); *H04W 76/12* (2018.02); *H04L 43/0852* (2013.01); *H04L 67/28* (2013.01); *H04W 76/11* (2018.02); *H04W 88/182* (2013.01)

(58) Field of Classification Search
USPC ........................................... 455/436
See application file for complete search history.

(56) References Cited

U.S. PATENT DOCUMENTS

| | | |
|---|---|---|
| 2006/0007934 A1 | 1/2006 | Chemiakina et al. |
| 2007/0127490 A1* | 6/2007 | Barbosa Da Torre ............... H04W 16/18 370/395.2 |
| 2013/0013791 A1 | 1/2013 | Kotecha et al. |
| 2013/0078994 A1* | 3/2013 | Jouin ............... G06F 3/1438 455/426.1 |
| 2013/0163428 A1 | 6/2013 | Lee et al. |
| 2015/0296418 A1* | 10/2015 | Szilagyi ............ H04W 36/0016 370/331 |

OTHER PUBLICATIONS

Yang, et al.; "TCP Congestion Avoidance Algorithm Identification"; IEEE/ACM Transactions on Networking; vol. 22, Issue 4; Sep. 9, 2013; 12 pages.

* cited by examiner

APPARATUS AND METHOD FOR CONTROLLING SPEED OF TRANSMISSION LAYER IN WIRELESS COMMUNICATION SYSTEM

CROSS-REFERENCE TO RELATED APPLICATIONS AND CLAIM OF PRIORITY

The present application is related to and claims benefit under 35 U.S.C. § 119(a) to Korean Application Serial No. 10-2014-0174236, which was filed in the Korean Intellectual Property Office on Dec. 5, 2014, the entire content of which is hereby incorporated by reference.

TECHNICAL FIELD

The present disclosure relates to a technology for controlling a speed of a transmission layer in a wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Due to the development of a mobile communication technology, a user can use the Internet through a mobile communication UE as well as a fixed personal computer. The UE can provide, to a user, services such as web browsing, video, and music through the Internet. A data Internet Protocol (IP) packet for the services can be transmitted from a server to the UE through a mobile communication network and an Internet network between the server and the UE. The UE can independently use the mobile communication network, and use the Internet network together with other UEs. For example, in a Long Term Evolution (LTE) network, the UE can independently use the LTE network using an allocated LTE bearer including a radio bearer and an Evolved Packer Core (EPC) bearer. The bearer, which is, for example, a logical tunnel between the UE and an eNB or between the eNB and a gateway, implies a unit of a Quality of Service (QoS) and resource management. In the Internet network, the IP packet of the UE can commonly use the Internet network for a connection between other UEs and another connection of the UE. At this time, in order to determine a transmission speed of the IP packet, a Transmission Control Protocol (TCP) can be used. The TCP corresponds to an End-to-End (E2E) Layer-4 (L4) protocol which can determine a reply speed of an ACKnowledge (ACK) packet transmitted in response to reception when the UE receives a data packet, and a maximum transmission speed, at which a network is not congested, using a sequence number of a reception packet included in the response packet. The TCP is an L4 protocol most frequently used for web, video, file transmission/reception, an E-mail service, etc. The TCP is an E2E protocol. Thus, due to shortage of information on a transmission path, a transmission rate may be lower than a maximum transmission rate through an available bandwidth and buffer saturation may occur. A delay time increases due to the low transmission rate and the buffer saturation, so that deterioration of a network performance may occur.

SUMMARY

An embodiment of the present disclosure provides an apparatus and method for improving efficiency of a mobile network and performing low-delay transmission in a mobile communication network.

An embodiment of the present disclosure provides an apparatus and method for controlling a transmission speed independently of an L4 protocol on the basis of user plane traffic using Radio Access Network (RAN) information and backhaul information in a mobile communication network.

Another embodiment of the present disclosure provides an apparatus and method for transmitting the information without installing a new interface for a packet for transmitting information in a mobile communication network.

Yet another embodiment of the present disclosure provides an apparatus and method for transmitting the RAN information and the backhaul information for transmission control in a mobile communication network.

Yet another embodiment of the present disclosure provides an apparatus and method for controlling a transmission speed of each of a plurality of L4 connections within a bearer in reflection of a preference of a mobile communication network provider or a user, in a mobile communication network.

In accordance with an embodiment of the present disclosure, a method of operating a proxy apparatus in a wireless communication system is provided. The method includes: receiving a plurality of packets from each of a plurality of servers through the Internet; and transmitting data of one bearer data including the plurality of packets to an eNB.

In accordance with an embodiment of the present disclosure, a method of operating an eNB in a wireless communication system is provided. The method includes receiving the one bearer data including a plurality of packets from the proxy apparatus.

In accordance with an embodiment of the present disclosure, a proxy apparatus in a wireless communication system includes: a communication unit that receives a plurality of packets from a plurality of servers through the Internet and transmits data of one bearer including the plurality of packets to an eNB.

In accordance with an embodiment of the present disclosure, an eNB apparatus in a wireless communication system is provided. The eNB apparatus includes a communication unit that receives the one bearer data including a plurality of packets from the proxy apparatus.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
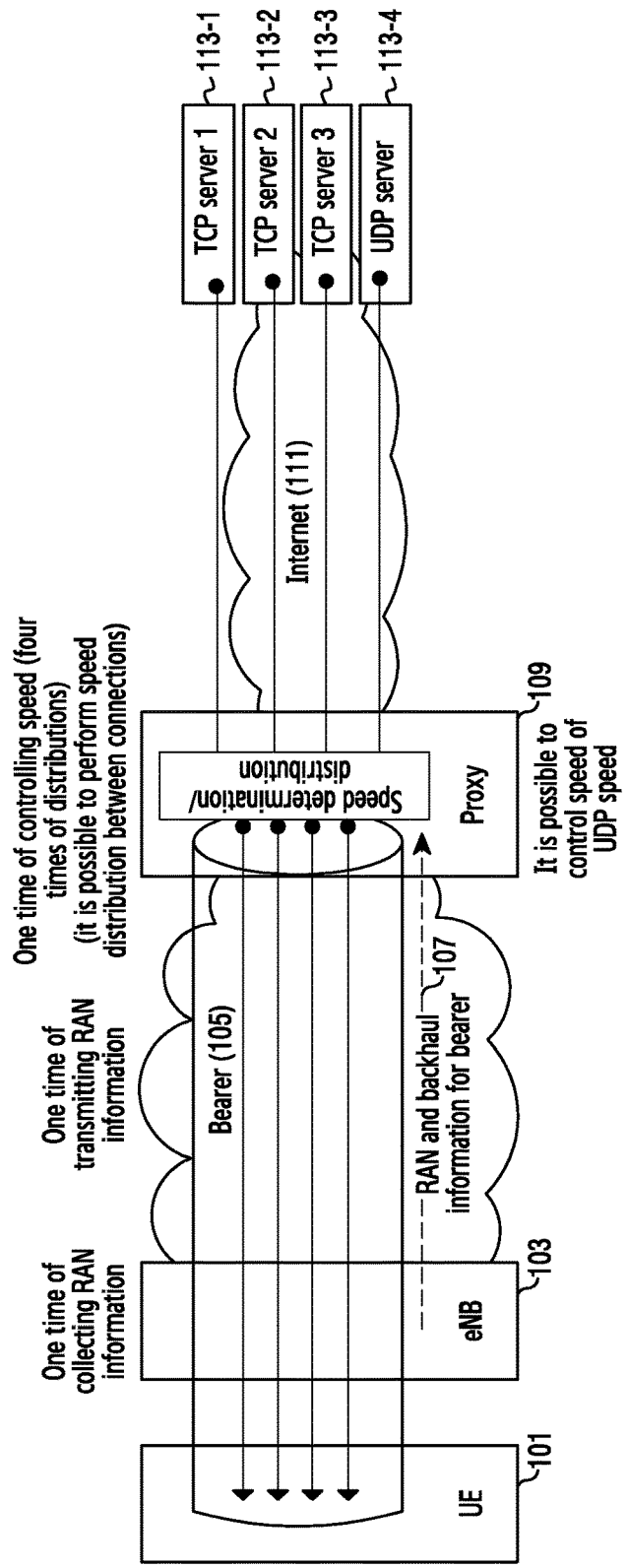
FIG. 1 illustrates an example of a communication environment for controlling a speed of a bearer on the basis of RAN information and backhaul information of the bearer according to an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, the operational principle of the present disclosure will be described in detail with reference to the accompanying drawings. In describing the present disclosure below, a detailed description of related known configurations or functions incorporated herein will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Accordingly, the terms should be defined based on the contents over the whole present specification.

Hereinafter, various embodiments of the present disclosure will be described more fully in conjunction with the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit various embodiments of the present disclosure to the particular embodiments disclosed herein, but the present disclosure should be construed to cover all modifications, equivalents, and/or alternatives falling within the spirit and scope of the various embodiments of the present disclosure. In the description of the drawings, identical or similar reference numerals are used to designate identical or similar elements.

As used in various embodiments of the present disclosure, the expressions "include", "may include", and other conjugates refer to the existence of a corresponding disclosed function, operation, or constituent element, and do not limit one or more additional functions, operations, or constituent elements. Further, as used in various embodiments of the present disclosure, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

While expressions including ordinal numbers, such as "first" and "second", as used in various embodiments of the present disclosure may modify various constituent elements, such constituent elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, without departing from the scope of the present disclosure, a first component element may be named a second component element. Similarly, the second component element also may be named the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms as used in various embodiments of the present disclosure are merely for the purpose of describing particular embodiments and are not intended to limit the various embodiments of the present disclosure. As used herein, the singular forms are intended to include the plural forms as well, unless the context clearly indicates otherwise. Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Hereinafter, in the present disclosure, a technology for improving a speed of a transmission layer in a wireless communication system will be described.

FIG. 1 illustrates an example of a communication environment for controlling a speed of a bearer on the basis of RAN information and backhaul information of the bearer according to an embodiment of the present disclosure.

Referring to FIG. 1, the UE 101 may be an electronic device including a communication function. For example, the terminal may include at least one of a smart phone, a tablet personal computer (PCs), a mobile phone, a video phone, an e-book reader, a desktop PC, a laptop PC, a netbook computer, a personal digital assistant (PDA), a portable multimedia player (PMP), a MP3 player, a mobile medical device, a camera, a wearable device (e.g., head-mounted-device (HMD) such as electronic glasses, electronic clothes, an electronic bracelet, an electronic necklace, an electronic appcessory, an electronic tattoo, or a smart watch).

The eNB 103, which is an element constituting a mobile communication system, provides wireless access to the UE 101 located within a cell, thereby supporting a connection between the UE 101 and a wireless access network. The proxy apparatus 109, which is an entity for connection between the wireless access network and an Internet network 111, manages a TCP connection between the UE 101 and the Transmission Control Protocol (TCP) servers 113-1 to 113-4. The TCP servers 113-1 to 113-4, which are TCP ends, communicate with the UE through a TCP connection which the UE 101 contains.

The eNB 103 can generate the RAN information and the backhaul information 107 in the bearer 105 unit. The eNB 103 can collect state information on a backhaul network of a path between the proxy apparatus 109 and the eNB 103. According to an embodiment of the present disclosure, the RAN information and the backhaul information 107 imply information including information on a quality of a wireless channel between the eNB 103 and a UE 101, state information of a buffer of the eNB 103, and handover state information of the UE 101. The handover state information may include information notifying of at least one of start of a handover, ongoing of the handover, and termination of the handover.

The eNB 103 can transmit the RAN information and the backhaul information 107 to the proxy apparatus 109. The eNB 103 can select an uplink EPC bearer to be used to transmit the RAN information and the backhaul information 107 in the bearer 105 unit to the proxy apparatus 109. The eNB 103 can transmit the RAN information and the backhaul information 107 in the bearer 105 unit to the proxy apparatus 109 using an inner IP header of an uplink data packet.

The proxy apparatus 109 can perform a transmission control on the basis of the RAN information and the backhaul information 107. The proxy apparatus 109 may be located at a mobile network Packet data network-GateWay (P-GW) or a Gateway GPRS Support Node (GGSN). The proxy apparatus 109 can control a transmission speed in the bearer 105 unit. The proxy apparatus 109 can apply the transmission speed in the bearer 105 unit differently to the TCP connection and a User Datagram Protocol (UDP) connection which use the bearer 105. For example, the proxy apparatus 109 can divide an E2E connection into two connection sections with respect to the proxy apparatus 109. For example, the proxy apparatus 109 can divide the connection sections into a first connection between the UE 101 and the proxy apparatus 109 and a second connection between the proxy apparatus 109 and servers 113-1 to 113-4. The proxy apparatus 109 can transmit data from the servers 113-1 to 113-4 to the UE 101 through the two connections.

The proxy apparatus 109 can make a request for the RAN information and the backhaul information 107 in the bearer 105 unit to the eNB 103. Accordingly, the eNB 103 can transmit the RAN information and the backhaul information 107 in the bearer 105 unit to the proxy apparatus 109. The proxy apparatus 109 can determine a transmission speed of a bearer corresponding to a RAN bearer on the basis of the RAN information and the backhaul information 107 in the bearer 105 unit, which has been received from the eNB 103 using a protocol. The protocol may be a protocol based on piggy-backing, which uses an option field of a header of a user plane packet for requesting and transmitting the RAN information and the backhaul information 107 between the proxy apparatus 109 and the eNB 103. At this time, the proxy apparatus 109 can determine the transmission speed of the bearer 105 in reflection of a policy of a network provider. The proxy apparatus 109 can distribute the determined transmission speed of the bearer 105 to a plurality of L4 connections connected to the UE 101.

According to an embodiment of the present disclosure, the proxy apparatus 109 may be located inside or outside the gateway (not illustrated). According to another embodiment of the present disclosure, the proxy apparatus 109 may be located inside or outside a separate apparatus (not illustrated) managed by a mobile communication network provider.

Figure 2:
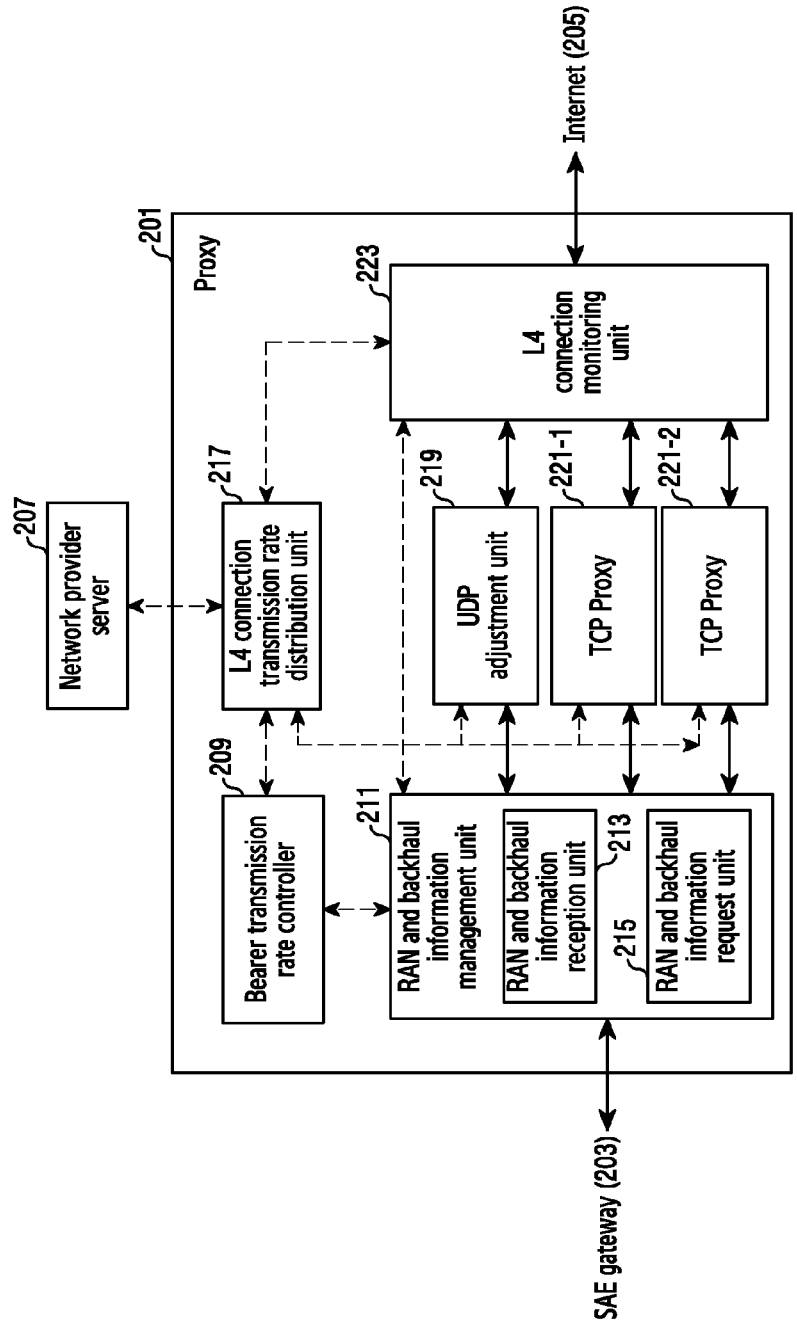
FIG. 2 is a block diagram illustrating a proxy apparatus according to an embodiment of the present disclosure.

FIG. 2 is a block diagram illustrating a proxy apparatus according to an embodiment of the present disclosure.

Referring to FIG. 2, the proxy apparatus 201 may include a RAN information and backhaul information management unit 211, a bearer transmission rate controller 209, an L4 connection transmission rate distribution unit 217, a UDP adjustment unit 219, and an L4 connection monitoring unit 223.

The RAN information and backhaul information management unit 211 include information for making a request for a state of a wireless bearer and information on a backhaul path to an eNB, in the header of the user plane packet, and then transmit the information to the mobile communication network. The RAN information and backhaul information management unit 211 can include, in a header of a downlink data packet, at least one of a request type notifying of whether the information which the proxy apparatus 201 makes a request for to the eNB is initial information, periodic information, or emergency information, a time stamp to be used for measuring a backhaul delay, by which the proxy apparatus 201 notifies of a time when the information is recorded, a reporting interval for reporting a time interval at which the eNB should report the information to the proxy apparatus 201, and a buffer threshold value by which the eNB determines a threshold value of standby data used by a bearer. Thus, the RAN information and backhaul information management unit 211 can make a request for at least one of pieces of the information to the eNB. For example, the information included in the header of the downlink data packet may include at least one of items represented in Table 1.

TABLE 1

| Item | Description |
| --- | --- |
| Request type | Item indicating whether type of information request made by proxy apparatus is request for initial information, periodic information, emergency information, or information on handover deceleration control |
| Bearer identifier | Identifier for identifying bearer by proxy apparatus (Evolved Packet System (EPS) bearer identifier or E-UTRAN Radio Access Bearer (E-RAB) identifier) |
| Time stamp | Request packet transmission time |
| Reporting interval | Time interval at which eNB reports information |
| Buffer threshold value | Size of queue satisfying required delay |

The RAN information and backhaul information management unit 211 can identify the RAN information and the backhaul information included in the header of the user plane packet by the eNB, and then transmit the RAN information and the backhaul information to the bearer transmission rate controller 209. Further, the RAN information and backhaul information management unit 211 can transmit the user plane packet from which the RAN information and the backhaul information included in the header is removed, to the UDP adjustment unit 219 and the TCP proxy apparatuses 221-1 and 221-2. The bearer transmission rate controller 209 can determine an optimum bearer transmission speed on the basis of the information transmitted from the RAN information and backhaul information management unit 211.

The L4 connection transmission rate distribution unit 217 can determine a transmission rate of each of L4 connections on the basis of at least one of an optimum transmission speed transmitted from the bearer transmission rate controller 209, information on each of L4 connections included in the bearer transmitted from the L4 connection monitoring unit 223, and a weighted point for each of the L4 connections transmitted from a network provider server 207. The L4 connection transmission rate distribution unit 217 can transmit the transmission rate of each of the L4 connections to the UDP adjustment unit 219 and the TCP proxy apparatuses 221-1 and 221-2.

The L4 connection transmission rate distribution unit 217 can determine a speed of the entire bearer. The L4 connection transmission rate distribution unit 217 can determine a transmission rate of the TCP connection or the UDP connection which corresponds to each L4 connection. The L4 connection transmission rate distribution unit 217 can identify an Internet bearer speed of a UE. When the UE uses three L4 connections, e.g., a connection for video streaming through the bearer, a connection for a file backup, and a connection for transmitting/receiving an E-mail, the network provider server 207 can improve a Quality of Experience (QoE) which is experienced with respect to a transmission speed of the UE by a user of the UE by granting a high weighted point to the connection for the video streaming. For example, the network provider server 207 can grant a weighted point of 6 to the connection for the video streaming, a weighted point of 3 to the connection for the file backup, and a weighted point of 1 to the connection for the E-mail. The network provider server 207 can generate information on the granted weighted point. The network provider server 207 can transmit the information on the weighted point to the L4 connection transmission rate distribution unit 217 according to a request of the L4 connection transmission rate distribution unit 217.

The L4 connection transmission rate distribution unit 217 can determine a transmission rate for each connection on the basis of the information on the weighted point. For example, when the Internet bearer transmission rate of the UE is 10 Mbps, the L4 connection transmission rate distribution unit 217 can determine a transmission rate of 6 Mbps (10 Mbps*6/(6+3+1)) with regard to the connection for the video streaming, a transmission rate of 3 Mbps (10 Mbps*3/(6+3+1)) with regard to the connection for the file backup, and a transmission rate of 1 Mbps (10 Mbps*3/(6+3+1)) with regard to the connection for the e-mail, by applying the weighted points of the connections to the transmission rates of the bearer, respectively.

The network provider server 207 can grant a high weighted point to an L4 connection used for a service provided by the network provider. Further, the network provider server 207 can grant a high weighted point to at least one of an L4 connection used for a real-time service such as video, voice, game, and video chatting, an L4 connection used for a service contracted with the network provider, an L4 connection used for a service frequently used by a user of the UE, and an L4 connection used for transmitting a file having a small size.

The L4 connection monitoring unit 223 can detect a new L4 connection by checking 5 tuples (e.g., a Source (S)-IP, a Destination (D)-IP, an S-port, a D-port, an L4 type) of an IP packet transmitted from a gateway or the Internet 205 and types (e.g., TCP synchronization, and TCP synchronization and response detection) of a packet. When the new L4 connection is detected, the L4 connection monitoring unit 223 can detect whether a bearer used by the new L4 connection is a bear through which the proxy apparatus 201 controls a current transmission speed or a new bearer. The L4 connection monitoring unit 223 can transmit a result of the detection to the bearer transmission rate controller 209 and the L4 connection transmission rate distribution unit 217.

When the bearer is a new bearer, the bearer transmission rate controller 209 can start a transmission speed control for the new bearer. When the bearer is the existing bearer, the L4 connection transmission rate distribution unit 217 can determine a transmission rate for each of the L4 connections including the new L4 connection.

Figure 3:
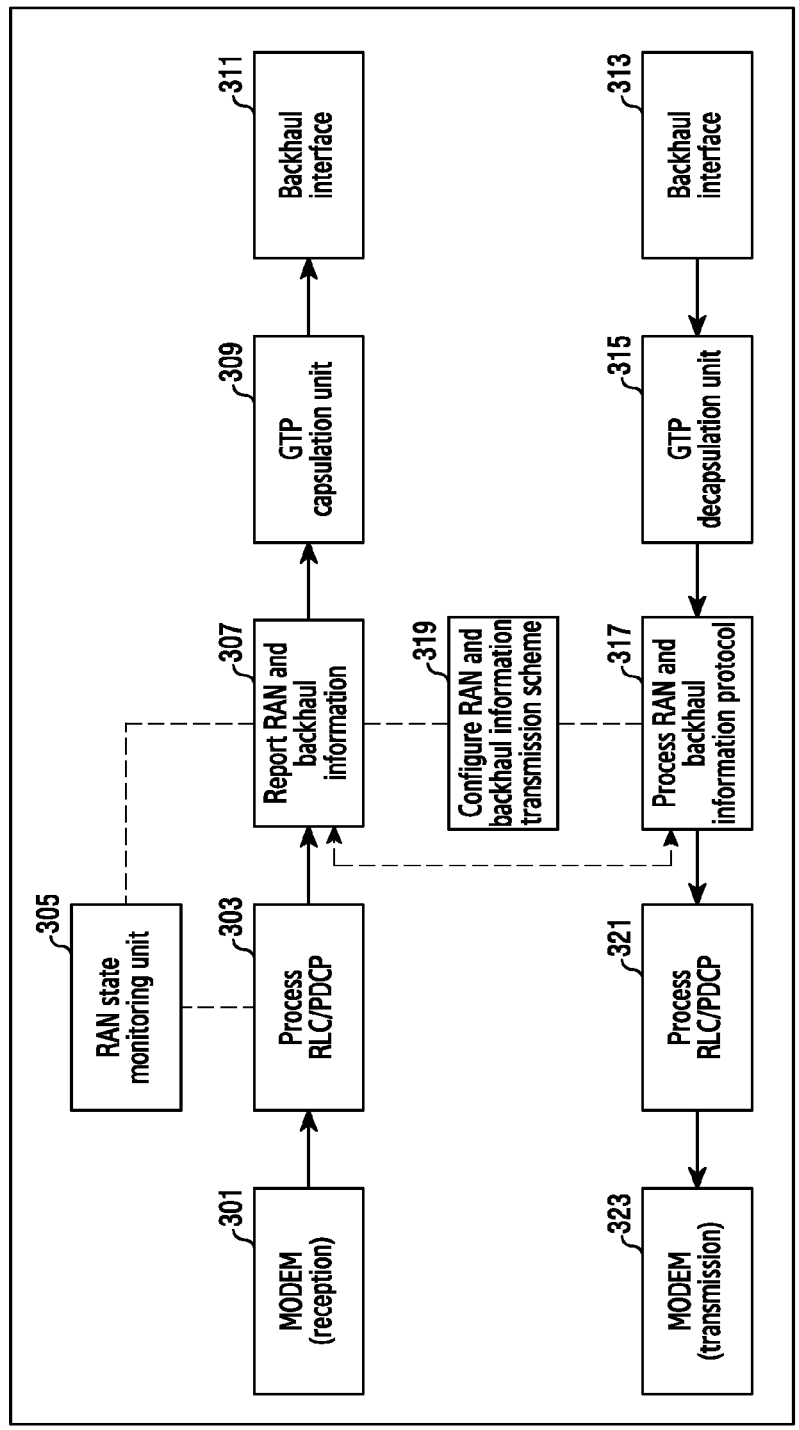
FIG. 3 is a block diagram illustrating an eNB according to an embodiment of the present disclosure.

FIG. 3 is a block diagram illustrating an eNB according to an embodiment of the present disclosure.

Referring to FIG. 3, the eNB can identify that the proxy apparatus has made a request for the RNA information and backhaul information through the user plane packet received from a backhaul.

The RAN information and backhaul information protocol processing unit 317 can identify whether the proxy apparatus has made a request for the RAN information and the backhaul information, by identifying an option field of an IP header while processing an inner IP layer. When identifying the request for the information, the RAN information and backhaul information protocol processing unit 317 can transmit the request for the information to a RAN information and backhaul information transmission configuration unit 319. The RAN information and backhaul information protocol processing unit 317 can measure a backhaul delay between the proxy apparatus and the eNB using the time stamp field of the option field of the IP header of the user plane packet transmitted to the UE regardless of whether the information has been requested. The RAN information and backhaul information protocol processing unit 317 can transmit a result of the measurement to the RAN information and backhaul information transmission configuration unit 319.

The RAN information and backhaul information transmission configuration unit 319 can determine an information transmission scheme corresponding to the request for the information, which is received from the RAN information and backhaul information protocol processing unit 317. For example, the RAN information and backhaul information transmission configuration unit 319 can determine an uplink bearer to be used for transmitting the information and determine the bearer information, a UE identifier, and an information transmission period, thereby transmitting the determined information to a RAN information and backhaul information reporting unit 307.

The RAN state detection unit 305 can collect state information of a wireless bearer corresponding to an EPC bearer. For example, the RAN state detection unit 305 can collect an average transmission speed between the reporting intervals of the wireless bearer and the size of data which waits for transmission to a buffer when reporting information of the wireless bearer is made. Further, the RAN state detection unit 305 can collect an average size of data waiting for transmission to a buffer between the reporting intervals of the wireless bearer, a time when an interval not sufficiently used occurs, and a time when the size of data waiting for the transmission to the buffer exceeds a buffer threshold value.

The RAN information and backhaul information reporting unit 307 can include specific information in the option field of the inner IP header of the user plane packet transmitted to the gateway in the information transmission scheme determined by the RAN information and backhaul information transmission configuration unit 319. For example, the specific information may include EPC bearer information including a bearer identifier and a UE identifier, a time stamp including a time when the eNB reports the information, the RAN state information received from the RAN state detection unit 305, backhaul delay state information, and handover state information including state information from a start of a handover to termination thereof. For example, the specific information may include at least one of items represented in Table 2 as follows.

TABLE 2

| Items | Description |
|---|---|
| Type of information | Item indicating whether type of transmitted information is initial information, periodic information, emergency information, or handover information |
| eNB identifier | Identifier for identifying eNB |
| Bearer identifier | Identifier for identifying bearer by proxy apparatus (e.g., EPS bear identifier or E-RAB identifier) |
| Time stamp | Time when information packet is transmitted |
| Backhaul delay | Difference between time stamp of proxy apparatus packet and time arriving at eNB |
| Transmission speed | Transmission speed of wireless bearer allocated to Internet bearer |
| Buffer size | Maximum size of queue allocated to bearer |
| Buffer threshold value | Size of queue satisfying required delay |
| Buffer state | State of queue of current buffer |
| Handover state | Display start, ongoing, and termination of handover |
| Type of handover | Identify whether handover is X2 handover or S1 handover |

The eNB can include the RAN information and the backhaul information in an uplink packet received from the UE on the basis of the request of the proxy apparatus. For example, the eNB does not include TCP responses corresponding to a plurality of TCP connections in the packet, and can include the RAN information and the backhaul information in the packet through distinguishment by the bearer. The eNB can include the specific information in the option field of the inner IP header. Since the eNB may not process a transmission layer including a TCP and a UDP, a load of the eNB for the packet processing can be minimized. Further, since the inner IP layer is maintained by the bearer, the inner IP header can be used for identifying the bearer in a proxy apparatus.

Figure 4:
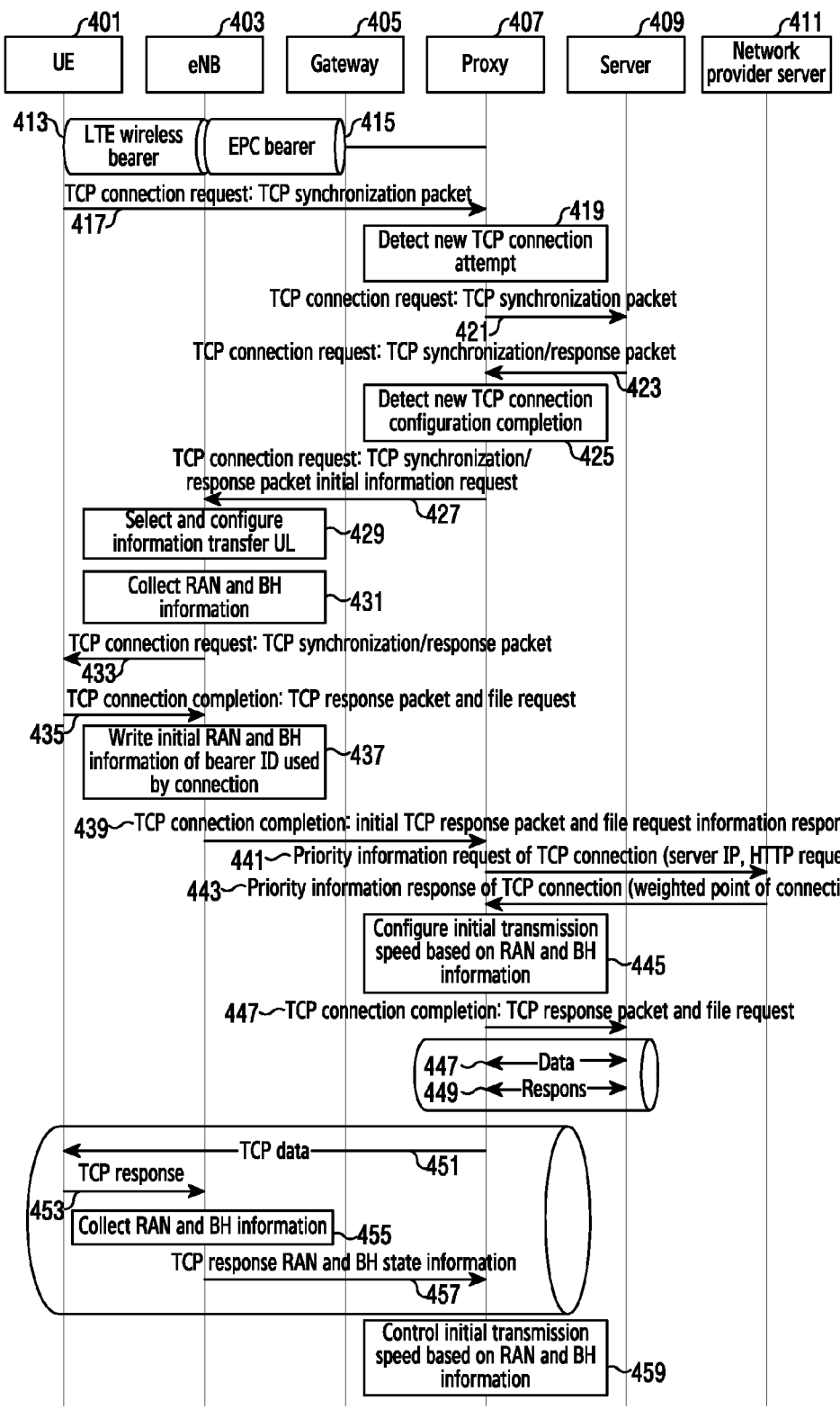
FIG. 4 is a signal flow diagram illustrating signal flow between network components for generating a new bearer and an L4 connection according to an embodiment of the present disclosure.

FIG. 4 is a signal flow diagram illustrating a signal flow between network components for generating a new bearer and an L4 connection according to an embodiment of the present disclosure.

Referring to FIG. 4, according to an embodiment of the present disclosure, it is assumed that an LTE wireless bearer 413 is preconfigured between a UE 401 and an eNB 403, and an EPC bearer is preconfigured between the eNB 403 and a gateway 405.

The UE 401 transmits a TCP synchronization packet to a proxy apparatus 407 in order to request a TCP connection configuration (as indicated by reference numeral 417). The proxy apparatus 407 detects that there is an attempt to generate a new TCP connection through the TCP synchronization packet received from the UE 401 (as indicated by reference numeral 419). For example, the proxy apparatus 407 can detect that there is an attempt to generate the new TCP connection using a type of the TCP synchronization packet and an IP 5 tuple. The proxy apparatus 407 transmits, to the server 409, the TCP synchronization packet for requesting the TCP connection configuration received from the UE 401 (as indicated by reference numeral 421). The server 409 transmits a TCP synchronization/response packet to the proxy apparatus 407 in response to the TCP synchronization packet (as indicated by reference numeral 423).

The proxy apparatus 407 identifies that a new TCP connection configuration is completed, through the TCP synchronization/response packet received from the server 409 (as indicated by reference numeral 425). For example, the proxy apparatus 407 can identify which bearer of a UE is used to generate an L4 connection, through an IP address of the TCP synchronization/response packet received from the server 409. In other words, the proxy apparatus 407 can identify whether the L4 connection is an L4 connection using a preconfigured bearer or an L4 connection using a new bearer rather than the preconfigured bearer. When the L4 connection is the L4 connection using a new bearer, the proxy apparatus 407 can make a request for the RAN information and the backhaul information to the eNB 403 in order to acquire information on the new bearer.

The proxy apparatus 407 can transmit the TCP synchronization/response packet received from the server 409 to the UE 401 (as indicated by reference numeral 427). The proxy apparatus 407 can include a message for initially requesting RAN information and backhaul information in a header of the TCP synchronization/response packet in order to acquire the information on the new bearer. According to an embodiment of the present disclosure, the proxy apparatus 407 can use the inner IP header for the message. According to another embodiment of the present disclosure, the proxy apparatus 407 can use a GPRS Tunneling Protocol-User plane (GTP-U) header or an outer IP header for the message. When the proxy apparatus 407 uses the GTP-U header or the outer IP header for the message, it may be necessary to transfer the information on the GTP-U header or the outer IP header to a header of another layer such as an inner IP header or a TCP header.

After receiving the TCP synchronization/response packet including the initial request for the RAN information and the backhaul information, the eNB 403 configures an uplink EPC bearer to be used when transmitting the RAN information and the backhaul information to the proxy apparatus 407 (as indicated by reference numeral 429). The uplink EPC bearer is generated to correspond one-to-one to a downlink EPC bearer according to a mobile communication network standard, in a bearer configuration step. Thus, the eNB can select an uplink EPC bearer corresponding to the downlink EPC bearer (as indicated by reference numeral 429). The eNB 403 collects the RAN information and the backhaul information (as indicated by reference numeral 431).

The eNB 403 transmits, to the UE 401, a TCP synchronization/response packet for requesting a TCP connection (as indicated by reference numeral 433). The eNB 403 can delete the message for initially requesting the RAN information and the backhaul information included in the header of the TCP synchronization/response packet and transmit the TCP synchronization/response packet to the UE 401.

The UE 401 transmits, to the eNB 403, a TCP response packet and file request message for notifying that a TCP connection is completed in a state in which a destination thereof is configured to be the server 409 (as indicated by reference numeral 435). The eNB 403 includes the RAN information and the backhaul information in the inner IP header of the first user plane packet transmitted through the uplink EPC bearer (as indicated by reference numeral 437). The eNB 403 further includes a UE identifier and a bearer identifier in the inner IP header at an initial response (as indicated by reference numeral 437). The eNB 403 transmits, to the proxy apparatus 407, a TCP response packet notifying that the TCP connection is completed and a response message for initial information for the file request (as indicated by reference numeral 439). According to another embodiment of the present disclosure, the eNB 403 can include and transmit the RAN information and the backhaul information to the proxy apparatus 407 using another packet transmitted through the uplink EPC bearer rather than a response packet for the TCP connection.

The proxy apparatus 407 receives a user plane packet including the initial RAN information and the initial backhaul information from the eNB 403. The proxy apparatus 407 identifies the initial RAN information and the initial backhaul information included in the inner IP header of the packet.

The proxy apparatus 407 transmits, to a network provider server 411, a message for requesting information on a priority or a weighted point for the TCP connection. The request message may include an IP address of a server and a Hyper Text Transfer Protocol (HTTP) Uniform Resource Locator (URL) included in a TCP connection completion message by the UE. The network provider server 411 can determine the information on the priority or the weighted point, on the basis of preference information corresponding to a type (e.g., video, web page, etc.) of transmission traffic identified through a server predetermined with respect to the TCP connection or the HTTP URL. The network provider server 411 transmits, to the proxy apparatus 407, the information on the priority or the weighted point (as indicated by reference numeral 433).

The proxy apparatus 407 determines an initial transmission speed of the bearer on the basis of the information on the priority or the weighted point, received from the network provider server 411, and the RAN information and the backhaul information received from the eNB 403 (as indicated by reference numeral 445). Further, the proxy apparatus 407 can distribute the initial transmission speed of the bearer to each TCP connection within the bearer.

The proxy apparatus 407 deletes the RAN information and the backhaul information included in the inner IP header, and then transmits the TCP response packet and file request message to the server 409 (as indicated by reference numeral 447). The server 409 transmits a TCP data packet to the proxy apparatus 407 (as indicated by reference numeral 447). The proxy apparatus 407 transmits a TCP response packet notifying that the TCP data packet has been received to the server 409 (as indicated by reference numeral 449).

The proxy apparatus 407 can transmit, to the UE 401, the TCP data packet received from the server 409 (as indicated by reference numeral 451). The UE 401 transmits, to the eNB 403, the TCP response message notifying that the TCP data packet has been received. The eNB 403 receives the TCP response message from the UE 401, and then transmits the TCP response packet of which an inner IP header includes the RAN information and the backhaul information, to the proxy apparatus 407 (as indicated by reference numeral 457). The proxy apparatus 407 determines a transmission speed of the bearer on the basis of the RAN information and the backhaul information, and distributes the determined transmission speed to each TCP connection included in the bearer (as indicated by reference numeral 459). Thereafter, the UE 401, the eNB 403, and the proxy apparatus 407 may repeatedly perform operations 451 to 459.

According to another embodiment of the present disclosure, the proxy apparatus 407 may be included in the gateway 405.

Figure 5:
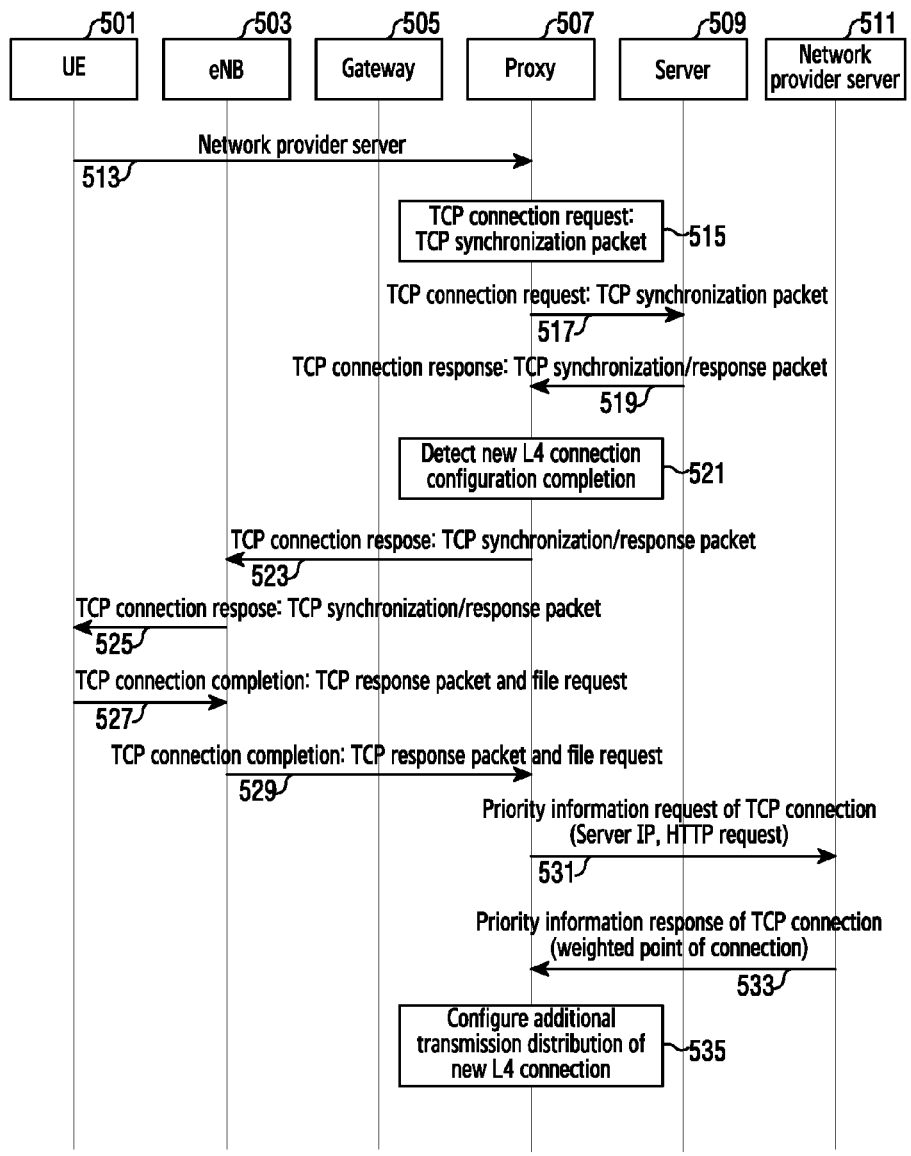
FIG. 5 is a signal flow diagram illustrating signal flow between network components for adding a new L4 connection to the existing bearer according to an embodiment of the present disclosure.

FIG. 5 is a signal flow diagram illustrating signal flow between network components for adding a new L4 connection to the existing bearer according to an embodiment of the present disclosure.

Referring to FIG. 5, a UE 501 transmits a TCP synchronization packet to a proxy apparatus 507 in order to request a TCP connection (as indicated by reference numeral 513). The proxy apparatus 507 detects that there is an attempt to generate a new TCP connection through an IP 5 tuple test of the TCP synchronization packet received from the UE 501 (as indicated by reference numeral 515). The proxy apparatus 507 transmits, to the server 509, the TCP synchronization packet received from the UE 501 in order to request the TCP connection (as indicated by reference numeral 517). The server 509 transmits a TCP synchronization/response packet to the proxy apparatus 407 in response to the TCP synchronization packet (as indicated by reference numeral 423). The proxy apparatus 507 identifies that a new L4 connection is generated, through the TCP synchronization/response packet received from the server 509. The proxy apparatus 507 identifies whether the new L4 connection is a connection using the existing bearer or a connection using another bearer, on the basis of an IP address of the UE 501 (as indicated by reference numeral 521).

The proxy apparatus 507 transmits, to the eNB 503, the TCP synchronization/response packet received from the server 509 (as indicated by reference numeral 523). At this time, when the new L4 connection is the connection using the existing bearer, since the existing bearer is preconfigured on the basis of the RAN information and the backhaul information, the proxy apparatus 507 may not make a request for the RAN information and the backhaul information to the eNB 503.

The eNB 503 transmits the TCP synchronization/response packet to the UE 501 (as indicated by reference numeral 525). The UE 501 transmits, to the eNB 503, the TCP response packet and file request message notifying that a configuration for the new L4 connection is completed (as indicated by reference numeral 527). The proxy apparatus 507 transmits, to a network provider server 511, a message for requesting priority information and weighted point information of a network provider for the new L4 connection (as indicated by reference numeral 531). The request message may include an IP or an HTTP URL of the server 509.

The network provider server 511 determines the priority information and the weighted point information on the basis of predetermined preference information, and transmits the priority information and the weighted point information to the proxy apparatus 507 (as indicated by reference numeral 533).

The proxy apparatus 507 determines a transmission speed for the new L4 connection using the existing bearer on the basis of the priority information and the weighted information received from the network provider server 511 (as indicated by reference numeral 535).

According to an embodiment of the present disclosure, the proxy apparatus 507 may be included in the gateway 505.

Figure 6:
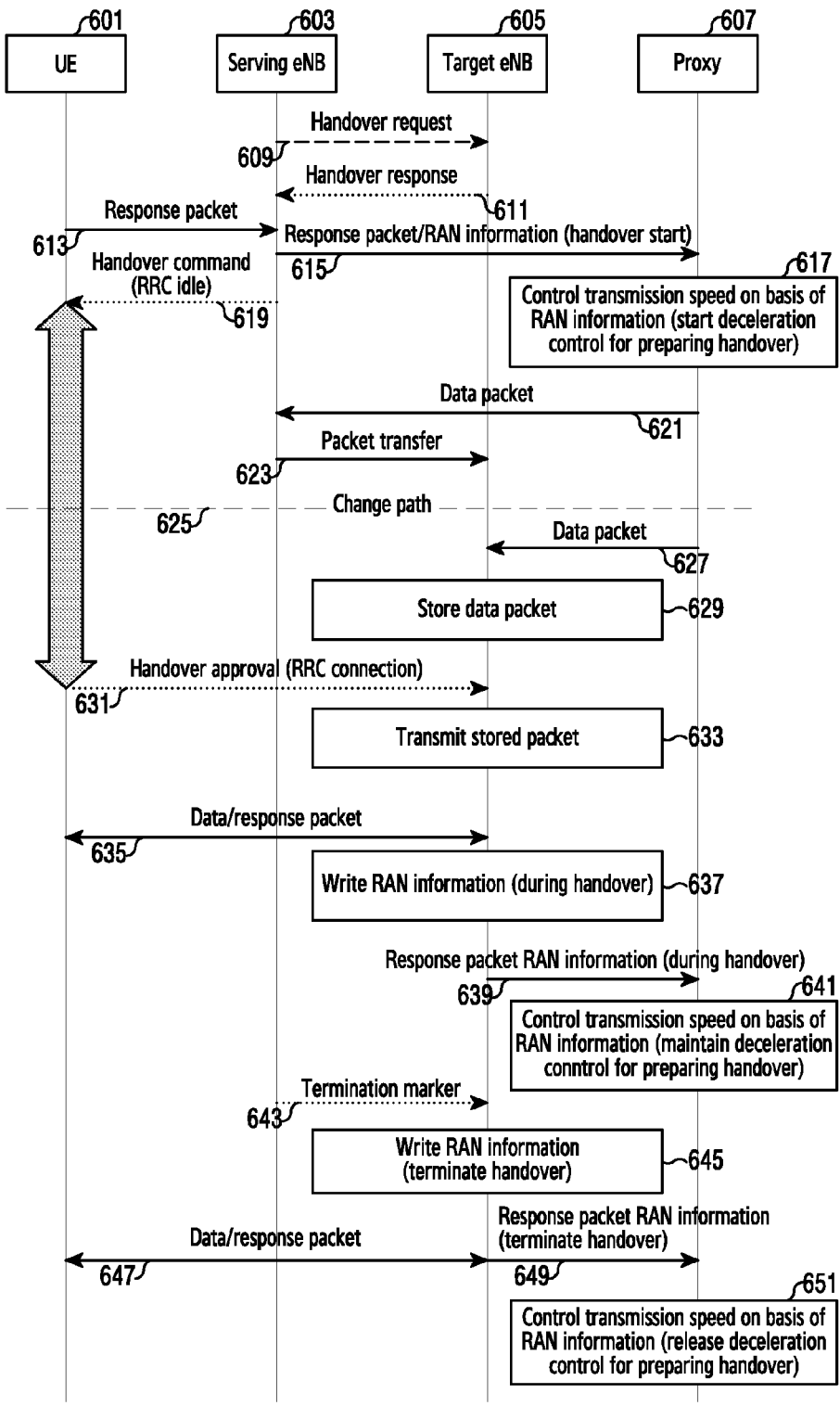
FIG. 6 is a signal flow diagram illustrating a signal flow between network components for preventing performance deterioration of an L4 connection at a handover of a UE according to an embodiment of the present disclosure.

FIG. 6 is a signal flow diagram illustrating signal flow between network components for preventing performance deterioration of an L4 connection at handover of a UE according to an embodiment of the present disclosure.

Referring to FIG. 6, when detecting a handover of the UE 601, a serving eNB 603 transmits a handover request message to a target eNB 605 (as indicated by reference numeral 609).

The target eNB 603 transmits, to the serving eNB 603, a response message to the handover request message (as indicated by reference numeral 611). The serving eNB 603 having received the response message can identify whether a type of the handover is an X2 handover or an Si handover and information on the target eNB 605. At this time, since a connection of a wireless bearer section is not terminated, an uplink packet (e.g., a TCP response packet) of the UE 601 is transmitted to the serving eNB 603 (as indicated by reference numeral 613). The serving eNB 603 having received the uplink packet includes, in a header of the uplink packet, information notifying that the UE 601 will be handed over, the type of the handover, and the information on the target eNB 605, and transmits the uplink packet to the proxy apparatus 607 (as indicated by reference numeral 615). For example, the header of the uplink packet may include an identifier of the target eNB 605, information on the type of the handover used for referencing a prediction time taken while the proxy apparatus 607 is handed over, and information on a handover state.

The proxy apparatus 607 makes a control to decrease a transmission speed of a bearer on the basis of the information included in the header of the uplink packet (as indicated by reference numeral 617). The UE 601 can release a wireless bearer connection with the serving eNB 603.

Before a connection between the UE 601 and the target eNB 605 is configured, in other words, before a path is changed (as indicated by reference numeral 625), a data packet transmitted by the proxy apparatus 607 can be transmitted to the serving eNB 603 (as indicated by reference numeral 621) and then transmitted from the serving eNB 603 to the target eNB 605 (as indicated by reference numeral 623). After a connection between the UE 601 and the target eNB 605 is configured, the data packet transmitted by the proxy apparatus 607 can be transmitted to the target eNB 605 through a gateway (not illustrated).

As described above, before a bearer between the UE 601 and the target eNB 605 is configured, the target eNB 605 can receive data packets from the proxy apparatus 607 through two paths. The data packets having been received through the two paths can be transmitted to the UE 601 through the same wireless bearer. At this time, the target eNB 605 can store, in different buffers, the data packets having been received through the two paths in order to prevent an error for a sequence number from occurring. In other words, the target eNB 605 can store data packets having been received from the serving eNB 603 in a first buffer and data packets having been received through the gateway in a second buffer (as indicated by reference numeral 629).

The UE 601 transmits a handover approval message including a Radio Common Carrier (RCC) connection request to the target eNB 605 (as indicated by reference numeral 631). The UE 601 can perform a wireless bearer connection with the target eNB 605. The target eNB 605 can transmit a downlink data packet through the wireless bearer connected to the UE 601 (as indicated by reference numeral 633). The UE 601 transmits an uplink data packet (e.g., a TCP response or uploading TCP packet) to the target eNB 605 through the wireless bearer connected to the target eNB 605 (as indicated by reference numeral 635).

The target eNB 605 having received the uplink data packet collects handover-related information in consideration of both a state of the first buffer and a state of the second buffer (as indicated by reference numeral 637). The handover-related information may include at least one of the size of data waiting in the first buffer, the size of data waiting in the second buffer, whether a termination marker packet is received, and a handover state. The handover state may include information notifying that a handover is being performed and information notifying that the handover is terminated.

After a wireless connection between the UE 601 and the target eNB 605 is configured, the information notifying that the handover is being performed may be included in the uplink packet transmitted to the proxy apparatus 607 by the target eNB 605 (as indicated by reference numeral 639). The proxy apparatus 607 can identify that the handover is being performed, through the uplink packet received from the target eNB 605. At this time, the proxy apparatus 607 maintains a deceleration control for a transmission speed on the basis of the handover information (as indicated by reference numeral 641). After the target eNB 605 receives the termination marker from the serving eNB 603 (as indicated by reference numeral 643), the target eNB 605 can include the information notifying that the handover is terminated in the uplink packet (as indicated by reference numeral 645).

The proxy apparatus 607 can detect that the handover is terminated, through the uplink packet received from the target eNB 605. At this time, the proxy apparatus 607 releases a deceleration control for a transmission speed on the basis of the handover state information (as indicated by reference numeral 651).

Figure 7:
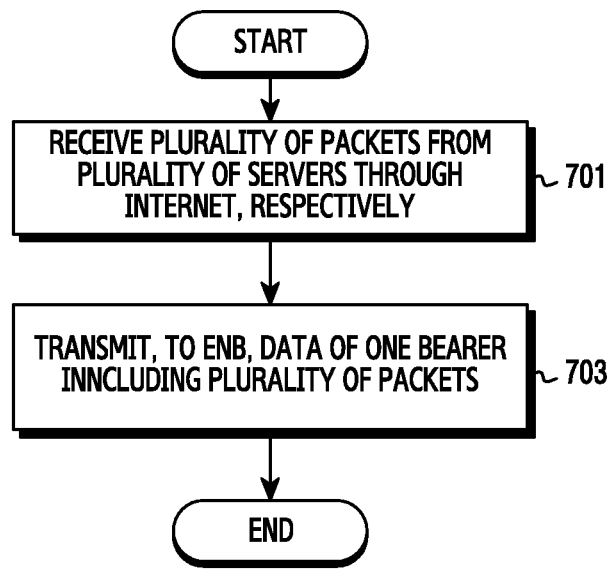
FIG. 7 is a flowchart illustrating a method of operating a proxy apparatus according to an embodiment of the present disclosure.

FIG. 7 is a flowchart illustrating a method of operating a proxy apparatus according to an embodiment of the present disclosure.

Referring to FIG. 7, the proxy apparatus receives a plurality of packets from a plurality of servers through the Internet, respectively, in step 701. According to an embodiment of the present disclosure, the proxy apparatus can receive, from the eNB, a packet including network information in the bearer unit, the network information including a plurality of high layer connections. The proxy apparatus can determine a transmission speed of the one bearer and a transmission speed for each of the plurality of high layer connections, on the basis of the network information.

The proxy apparatus can transmit a message for requesting the network information in the bearer unit to the eNB. The proxy apparatus can transmit a message for requesting the weighted point information to the network provider. The proxy apparatus can receive, from the network provider, the information on the weighted point of each of the plurality of high layer connections included in the one bearer. The proxy apparatus can determine the transmission speed of the one bearer and the transmission speed for each of the plurality of connections.

The proxy apparatus can determine the transmission speed of the one bearer and the transmission speed for each of the plurality of high layer connections, on the basis of the network information. The proxy apparatus can receive, from the eNB, a message for requesting a new high layer connection of at least one UE.

When the new high layer connection is a connection included in the one bearer, the proxy apparatus can transmit, to the network provider, the message for requesting the information on the weighted point for the new high layer connection, receive, from the network provider, the information on the weighted point for the new high layer connection, and determine the transmission speed of the one bearer and the transmission speed of each of the plurality of high layer connections including the new high layer connection on the basis of the network information, the weighted point information, and the information on the weighted point of the new high layer connection.

When the new high layer connection is a connection included in another bearer, the proxy apparatus can receive, from the eNB, the network information of the another bearer, receive, from the network provider, the information on the weighted point for each of the plurality of high layer connections including the new high layer connection within the another bearer, and determine a transmission speed of the another bearer and the transmission speed for each of the plurality of high layer connections including the new high layer connection on the basis of the network information of the another bearer and the information on the weighted point for each of the plurality of high layer connections including the new high layer connection.

Here, the network information may be included in the header of the packet and may include at least one of information on a request type, identification information, and information for controlling a transmission speed.

For example, the identification information may include at least one of an eNB identifier and a bearer identifier. The information for controlling the transmission speed may include at least one of the packet transmission time, a time taken until the message for requesting the network information arrives at the eNB, the transmission speed of the one bearer, the maximum size of a buffer allocated to the one bearer, the maximum threshold value of the buffer, and the size of data stored in the buffer. The information on the handover may include information on whether a handover for at least one UE connected to the eNB is started, the handover is being performed, or the handover is terminated.

When receiving, from the proxy apparatus, the network information including the information on the handover, the proxy apparatus can control the transmission speed of the one bearer on the basis of the information on the handover. The proxy apparatus can make a control to decrease the transmission speed of the one bearer when the handover for the at least one UE starts and terminates the control to decrease the transmission speed when the handover for the at least one UE is terminated.

In step 703, the proxy apparatus transmits data of one bearer including the plurality of packets to an eNB. The proxy apparatus can generate the data of the one bearer, including the plurality of packets received from the plurality of servers and transmit the generated data of the one bearer to the eNB.

Figure 8:
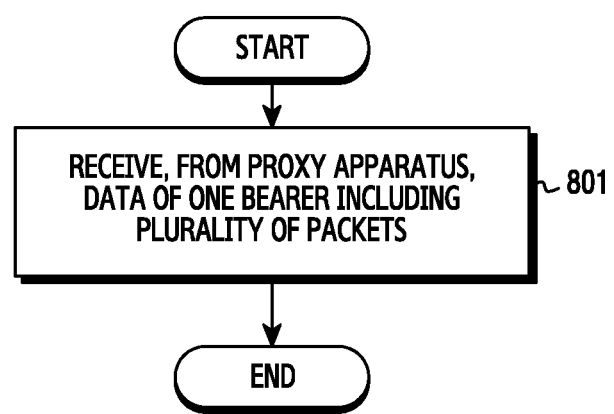
FIG. 8 is a block diagram illustrating a method of operating an eNB according to an embodiment of the present disclosure.

FIG. 8 is a block diagram illustrating a method of operating an eNB according to an embodiment of the present disclosure.

Referring to FIG. 8, in step 801, the eNB generates a packet including the network information in the one bearer unit, the network information including a plurality of high layer connections. The eNB can transmit the packet to the proxy apparatus. The eNB may include the network information in a header of the packet.

The eNB can receive, from the proxy apparatus, the message for requesting the network information. The eNB can transmit, to the proxy apparatus, the packet according to a predetermined transmission period on the basis of the message. The eNB, can transmit, to the proxy apparatus, a connection request message of at least one UE requesting at least one high layer connection to a server.

The eNB can receive, from the proxy apparatus, the message for requesting the network information in a bearer unit, the network information including the high layer connection requested by the at least one UE. The eNB can transmit, to the proxy apparatus, the packet including the network information in a bearer unit.

Here, the network information may be included in the header of the packet and may include at least one of information on a request type, identification information, and information for controlling a transmission speed.

For example, the identification information may include at least one of an eNB identifier and a bearer identifier. The information for controlling the transmission speed may include at least one of the packet transmission time, a time taken until the message for requesting the network information arrives at the eNB, the transmission speed of the one bearer, the maximum size of a buffer allocated to the one bearer, the maximum threshold value of the buffer, and the size of data stored in the buffer. The information on the handover may include information on whether a handover for at least one UE connected to the eNB is started, the handover is being performed, or the handover is terminated.

Figure 9:
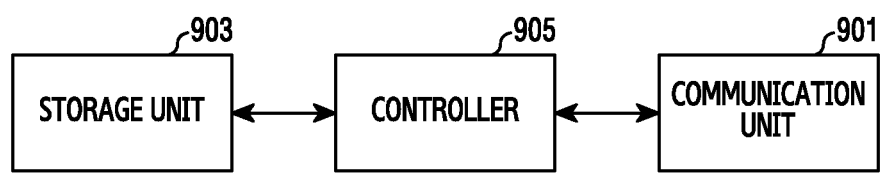
FIG. 9 is a block diagram illustrating a proxy apparatus according to an embodiment of the present disclosure.

FIG. 9 is a block diagram illustrating a proxy apparatus according to an embodiment of the present disclosure.

A communication unit 901 performs a function of processing transmission/reception of a wireless signal of data input/output through an antenna (not illustrated). For example, in a case of transmission, data to be transmitted is subjected to channel coding, spreading, and then RF processing, and is transmitted. In a case of reception, a received RF signal is converted into a baseband signal, and the baseband signal is de-spread and channel-decoded, and thus data is reconstructed. In addition to a general function, according to an embodiment of the present disclosure, the communication unit 901 can receive a plurality of packets from a plurality of servers through the Internet, and transmit, to an eNB, data of one bearer including the plurality of packets.

The communication unit 901 can receive, from the eNB, a packet including network information. The communication unit 901 can transmit, to the eNB, the message for requesting the network information in a bearer unit and transmit, to the network provider, the message for requesting the weighted point information. The communication unit 901 can receive, from the network provider, the information on the weighted point of each of the plurality of high layer connections included in the one bearer.

The communication unit 901 can receive, from the eNB, a message for requesting a new high layer connection of at least one UE. When the new high layer connection is a connection included in the one bearer, the communication unit 901 can transmit a message for requesting the information on the weighted point for the new high layer connection from the network provider, and receive, from the network provider, the information on the weighted point of the new high layer connection. When the new high layer connection is a connection included in another bearer, the communication unit 901 can receive, from the eNB, the network information of the other bearer and the information on the weighted point of each of the plurality of high layer connections including the new high layer connection within the another bearer.

A memory unit 903 stores a micro code of a program for processing and controlling of a controller 905 and various pieces of reference data. In addition to a general function, the memory unit 903 according to an embodiment of the present disclosure can store network information including at least one of information on a request type, identification information, and information for controlling a transmission speed.

For example, the identification information may include at least one of an eNB identifier and a bearer identifier. The information for controlling the transmission speed may include at least one of the packet transmission time, a time taken until the message for requesting the network information arrives at the eNB, the transmission speed of the one bearer, the maximum size of a buffer allocated to the one bearer, the maximum threshold value of the buffer, and the size of data stored in the buffer. The information on the handover may include information on whether a handover for at least one UE connected to the eNB is started, the handover is being performed, or the handover is terminated.

The controller 905 controls an overall operation of the proxy apparatus. For example, the controller 905 can perform processing and control for data communication. In addition to a general function, the controller 905 according to an embodiment of the present disclosure can determine a transmission speed of the one bearer and a transmission speed of each of the plurality of high layer connections on the basis of network information in one bearer unit, the network information including a plurality of high layer connections.

The controller 905 can determine the transmission speed of the one bearer and the transmission speed for each of the plurality of high layer connections, on the basis of the network information and the weighted point information. The controller 905 can determine the transmission speed of the one bearer and the transmission speed for each of the plurality of high layer connections including the new high layer connection, on the basis of the network information, the weighted point information, and the information on the weighted point for the new high layer connection. The controller 905 can determine a transmission speed of the other bearer and the transmission speed of each of the plurality of high layer connections including the new high layer connection on the basis of the network information of the other bearer and the information on the weighted point of each of the plurality of high layer connections including the new high layer connection.

When receiving, from the proxy apparatus, the network information including the information on the handover, the controller 905 can control the transmission speed of the one bearer on the basis of the information on the handover. The controller 905 can make a control to decrease the transmission speed of the one bearer when the handover for the at least one UE starts and terminates the control to decrease the transmission speed when the handover for the at least one UE is terminated.

Figure 10:
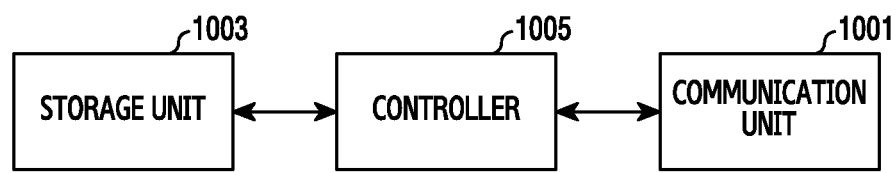
FIG. 10 is a block diagram illustrating an eNB according to an embodiment of the present disclosure.

FIG. 10 is a block diagram illustrating an eNB apparatus according to an embodiment of the present disclosure.

A communication unit 1001 performs a function of processing transmission/reception of a wireless signal of data input/output through an antenna (not illustrated). For example, in a case of transmission, data to be transmitted is subjected to channel coding, spreading, and then RF processing, and is transmitted. In a case of reception, a received RF signal is converted into a baseband signal, and the baseband signal is de-spread and channel-decoded, and thus data is reconstructed. In addition to a general function, according to an embodiment of the present disclosure, the communication unit 1001 can receive, from a proxy apparatus, data of one bearer including a plurality of packets. The communication unit can transmit the packet to the proxy apparatus.

The communication unit 1001 can receive, from the proxy apparatus, the message for requesting the network information and transmit, to the proxy apparatus, the packet according to a predetermined transmission period on the basis of the message. The communication unit 1001 can transmit, to the proxy apparatus, a connection request message of at least UE which requests a high layer connection to at least one server, receive, from the proxy apparatus, a message for requesting network information in a bearer unit, the network information including the high layer connection requested by the at least one UE, and transmit, to the proxy apparatus, a packet including the network information in a bearer unit.

The memory unit 1003 stores a micro code of a program for processing and control of a controller 1005 and various pieces of reference data. In addition to a general function, the memory unit 1003 according to an embodiment of the present disclosure can store network information including at least one of information on a request type, identification information, and information for controlling a transmission speed. For example, the identification information may include at least one of an eNB identifier and a bearer identifier. The information for controlling the transmission speed may include at least one of the packet transmission time, a time taken until the message for requesting the network information arrives at the eNB, the transmission speed of the one bearer, the maximum size of a buffer allocated to the one bearer, the maximum threshold value of the buffer, and the size of data stored in the buffer. The information on the handover may include information on whether a handover for at least one UE connected to the eNB is started, the handover is being performed, or the handover is terminated.

The controller 1005 controls an overall operation of the eNB apparatus. For example, the controller 1005 can perform processing and control for data communication.

In addition to a general function, the controller 1005 according to an embodiment of the present disclosure can generate a packet including the network information in one bearer unit, the networking information including a plurality of high layer connections. The controller 1005 may include the network information in a header of the packet.

Methods stated in claims and/or specifications according to various embodiments may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular or plural expressions are selected to be suitable for proposed situations for convenience of description, and the present disclosure is not limited to the singular or plural elements. An element expressed in a plural form may be configured in singular, or an element expressed in a singular form may be configured in plural.

According to various embodiment of the present disclosure, a method for operating a proxy apparatus in a wireless communication system, comprises receiving a plurality of packets from a plurality of servers, and transmitting, to a base station, data of one bearer including the plurality of packets.

The method may further comprise receiving, from the base station, a packet including network information in the one bearer unit, wherein the network information includes a plurality of high layer connections, and determining a transmission speed of the one bearer and a transmission speed of each of the plurality of high layer connections based on the network information.

The method may further comprise transmitting, to the base station, a first message for requesting the network information in the one bearer unit, and transmitting, to a network provider, a second message for requesting weighted point information.

The method may further comprise receiving, from a network provider, information on a weighted point of each of the plurality of high layer connections included in the one bearer.

The determining of the transmission speed of the one bearer and the transmission speed for each of the plurality of high layer connections may comprise determining the transmission speed of the one bearer and the transmission speed of each of the plurality of high layer connections based on the network information and the weighted point information.

The method may further comprise receiving, from the base station, a connection message for requesting a new high layer connection of at least one of UE.

The method may further comprise when the new high layer connection is a connection included in the one bearer, transmitting, to the network provider, a message for requesting information on a weighted point of the new high layer connection, receiving, from the network provider, the information on the weighted point of the new high layer connection, and determining the transmission speed of the one existing bearer and the transmission speed of each of the plurality of high layer connections including the new high layer connection based on the network information, the weighted point information, and the information on the weighted point for the new high layer connection.

The method may further comprise when the new high layer connection is a connection included in another bearer, receiving network information of the another bearer from the base station, receiving, from the network provider, the information on the weighted point of each of the plurality of high layer connections including the new high layer connection within the another bearer, and determining a transmission speed of the another bearer and a transmission speed of each of the plurality of high layer connections including the new high layer connection based on the network information of the another bearer and the information on the weighted point for each of the plurality of high layer connections including the new high layer connection.

The network information is included in a header of the packet and comprises one or more of information on a request type, identification information, or information for controlling a transmission speed.

The identification information comprises one or more of a base station identifier or a bearer identifier.

The information for controlling the transmission speed comprises one or more of a time taken while the packet is transmitted, a time taken until the message for requesting the network information arrives at the base station, the transmission speed of the one bearer, the maximum size of a buffer allocated to the one bearer, the maximum threshold value of the buffer, or the size of data stored in the buffer.

The information on the request type may comprise information notifying whether the network information is initially-transmitted information, periodically-transmitted information, urgently-transmitted information, or information on a handover.

The information on the handover may comprise information notifying whether a handover for one or more of UE connected to the base station has started, is being performed, or is terminated.

The method may further comprise controlling the transmission speed of the one bearer based on the information on the handover when receiving, from the proxy apparatus, the network information including the information on the handover.

Controlling the transmission speed of the one bearer may comprise decreasing the transmission speed of the one bearer when the handover for the at least one of UE starts, and terminating the decreasing of the transmission speed of the one bearer when the handover for the at least one of UE is terminated.

According to various embodiment of the present disclosure, a method for operating a base station in a wireless communication system, comprise receiving, from a proxy apparatus, data of one downlink bearer including a plurality of packets.

The method may further comprise generating a packet including network information in the one bearer unit, wherein the network information comprises a plurality of high layer connections, and transmitting the packet to the proxy apparatus.

Transmitting the packet may comprise inserting the network information in a header of the packet transmitted to the proxy apparatus through an uplink bearer corresponding to the bearer.

Transmitting the packet to the proxy apparatus may comprise receiving, from the proxy apparatus, a message for requesting the network information, and transmitting the packet to the proxy apparatus according to a predetermined transmission period on the basis of the message.

Transmitting the packet to the proxy apparatus may comprise transmitting, to the proxy apparatus, a connection request message of at least one of UE requesting a high layer connection to at least one of server, receiving, from the proxy apparatus, a message for requesting the network information in the one bearer unit, wherein the network information includes the high layer connection requested by the at least one of UE, and transmitting, to the proxy apparatus, the packet including the network information in the one bearer unit.

The network information may comprise one or more of information on a request type, identification information, or information for controlling a transmission speed.

The identification information may comprise one or more of a base station identifier and a bearer identifier.

The information for controlling the transmission speed may comprise one or more of a time taken while the packet is transmitted, a time taken while the message for requesting the network information arrives at the base station, the transmission speed of the one bearer, the maximum size of a buffer allocated to the one bearer, the maximum threshold value of the buffer, or the size of data stored in the buffer.

The information on the request type may comprise information notifying whether the network information is initially-transmitted information, periodically-transmitted information, urgently-transmitted information, or information on a handover.

The information on the handover comprises information notifying whether a handover for the one or more of UE connected to the base station is started, is being performed, or is terminated.

According to various embodiment of the present disclosure, a proxy apparatus in a wireless communication system, comprise a communication device configured to receive a plurality of packets from a plurality of servers, and transmit, to base station, data of one bearer including the plurality of packets.

The proxy apparatus may further comprise a controller configured to determine a transmission speed of the one bearer and a transmission speed of each of the plurality of high layer connections based on network information in the one bearer unit, the network information including a plurality of high layer connections, wherein the communication device is configured to receive, from the base station, a packet including the network information.

The communication device may be configured to transmit, to the base station, a first message for requesting the network information in the one bear unit, and to transmit, to a network provider, a second message for requesting weighted point information.

The communication device may be configured to receive, from a network provider, information on a weighted point of each of the plurality of high layer connections included in the one bearer.

The controller may be configured to determine the transmission speed of the one bearer and the transmission speed of each of the plurality of high layer connections based on the network information and the weighted point information.

The communication device may be configured to receive, from the base station, a connection message for requesting a new high layer connection of at least one of UE.

The communication device may be configured to transmit a message for requesting information on a weighted point of the new high layer connection to the network provider when the new high layer connection is a connection included in the existing one bearer, and to receive, from the network provider, the information on the weighted point of the new high layer connection, and the controller is configured to determine the transmission speed of the one bearer and the transmission speed of each of the plurality of high layer connections including the new high layer connection based on the network information, the weighted point information, and the information on the weighted point for the new high layer connection.

The communication device may be configured to receive network information of another bearer from the base station when the new high layer connection is a connection included in the another bearer, and to receive, from the network provider, the information on the weighted point of each of the plurality of high layer connections including the new high layer connection within the another bearer, and the controller may be configured to determine a transmission speed of the another bearer and a transmission speed of each of the plurality of high layer connections including the new high layer connection based on the network information of the another bearer and the information on the weighted point for each of the plurality of high layer connections including the new high layer connection.

The network information may be included in a header of the packet and comprises one or more of information on a request type, identification information, or information for controlling a transmission speed.

The identification information may comprise one or more of a base station identifier or a bearer identifier.

The information for controlling the transmission speed may comprise one or more of a time taken while the packet is transmitted, a time taken until the message for requesting the network information arrives at the base station, the transmission speed of the one bearer, the maximum size of a buffer allocated to the one bearer, the maximum threshold value of the buffer, or the size of data stored in the buffer.

The information on the request type may comprise information notifying whether the network information is initially-transmitted information, periodically-transmitted information, urgently-transmitted information, or information on a handover.

The information on the handover may comprise information notifying whether a handover for one or more of UE connected to the base station has started, is being performed, or is terminated.

The controller may be configured to control the transmission speed of the one bearer based on the information on the handover when receiving, from the proxy apparatus, the network information including the information on the handover.

The controller may be configured to decrease the transmission speed of the one bearer when the handover for the at least one of UE starts, and terminates decreasing the transmission speed of the one bearer when the handover for the at least one of UE is terminated.

According to various embodiment of the present disclosure, a base station apparatus in a wireless communication system, comprises a communication device configured to receive, from a proxy apparatus, data of one bearer including a plurality of packets.

The base station may further comprise a controller configured to generate a packet including network information in the one bearer unit, wherein the network information comprises a plurality of high layer connections, wherein the communication device is configured to transmit the packet to the proxy apparatus.

The controller may be configured to insert the network information in a header of the packet transmitted to the proxy apparatus through an uplink bearer corresponding to the bearer.

The communication device may be configured to receive, from the proxy apparatus, a message for requesting the network information, and to transmit the packet to the proxy apparatus according to a predetermined transmission period on the basis of the message.

The communication device may be configured to transmit, to the proxy apparatus, a connection request message of at least one of UE requesting a high layer connection to at least one of server, receive, from the proxy apparatus, a message for requesting the network information in the one bearer unit, the network information including the high layer connection requested by the at least one of UE, and transmit, to the proxy apparatus, the packet including the network information in the one bearer unit.

The network information may comprise one or more of information on a request type, identification information, or information for controlling a transmission speed.

The identification information may comprise one or more of a base station identifier and a bearer identifier.

The information for controlling the transmission speed may comprise one or more of a time taken while the packet is transmitted, a time taken while the message for requesting the network information arrives at the base station, the transmission speed of the one bearer, the maximum size of a buffer allocated to the one bearer, the maximum threshold value of the buffer, or the size of data stored in the buffer.

The information on the request type may comprise information notifying whether the network information is initially-transmitted information, periodically-transmitted information, urgently-transmitted information, or information on a handover.

The information on the handover may comprise information notifying whether a handover for the one or more of UE connected to the base station is started, is being performed, or is terminated. Although specific exemplary embodiments have been described in the detailed description of the present disclosure, various change and modifications may be made without departing from the spirit and scope of the present disclosure. Therefore, the scope of the present disclosure should not be defined as being limited to the embodiments, but should be defined by the appended claims and equivalents thereof.

What is claimed is:

1. A method for operating a proxy apparatus in a wireless communication system, the method comprising:
    receiving, from a base station, a packet including network information comprising information notifying whether a handover for one or more user equipments (UEs) connected to the base station has started, is being performed, or is terminated;
    receiving a plurality of packets from a plurality of servers;
    determining a transmission speed of one bearer including the plurality of packets based on the network information;
    transmitting, to the base station, data of the one bearer based on the determined transmission speed; and
    controlling the transmission speed of the one bearer based on whether the handover for the one or more UEs connected to the base station has started, is being performed, or is terminated,
    wherein controlling the transmission speed of the one bearer comprises:
        decreasing the transmission speed of the one bearer when the handover for the one or more UEs starts; and
        terminating the decreasing of the transmission speed of the one bearer when the handover for the one or more UEs is terminated.

2. The method of claim 1, wherein the network information including a plurality of high layer connections is received in the one bearer, and
    wherein the method further comprises determining the transmission speed of the one bearer and a transmission speed of each of the plurality of high layer connections based on the network information.

3. The method of claim 2, further comprising:
    transmitting, to the base station, a first message for requesting the network information in the one bearer; and
    transmitting, to a network provider, a second message for requesting weighted point information.

4. The method of claim 2, further comprising receiving, from a network provider, information on a weighted point of each of the plurality of high layer connections included in the one bearer.

5. The method of claim 4, wherein the determining of the transmission speed of the one bearer and the transmission speed for each of the plurality of high layer connections comprises:

determining the transmission speed of the one bearer and the transmission speed of each of the plurality of high layer connections based on the network information and the information on the weighted point.

6. The method of claim 2, further comprising receiving, from the base station, a connection message for requesting a new high layer connection of at least one of UE.

7. The method of claim 6, further comprising:
when the new high layer connection is a connection included in the one bearer, transmitting, to a network provider, a message for requesting information on a weighted point of the new high layer connection;
receiving, from the network provider, the information on the weighted point of the new high layer connection; and
determining the transmission speed of the one bearer and the transmission speed of each of the plurality of high layer connections including the new high layer connection based on the network information, weighted point information, and the information on the weighted point for the new high layer connection.

8. The method of claim 6, further comprising:
when the new high layer connection is a connection included in another bearer, receiving network information of the another bearer from the base station;
receiving, from a network provider, the information on a weighted point of each of the plurality of high layer connections including the new high layer connection within the another bearer; and
determining a transmission speed of the another bearer and a transmission speed of each of the plurality of high layer connections including the new high layer connection based on the network information of the another bearer and the information on the weighted point for each of the plurality of high layer connections including the new high layer connection.

9. The method of claim 2, wherein the network information is included in a header of the packet and comprises one or more of information on a request type, identification information, or information for controlling a transmission speed.

10. The method of claim 9, wherein the identification information comprises one or more of a base station identifier or a bearer identifier.

11. The method of claim 9, wherein the information for controlling the transmission speed comprises one or more of a time taken while the packet is transmitted, a time taken until message for requesting the network information arrives at the base station, the transmission speed of the one bearer, a maximum size of a buffer allocated to the one bearer, a maximum threshold value of the buffer, or a size of data stored in the buffer.

12. The method of claim 9, wherein the information on the request type comprises information notifying whether the network information is initially-transmitted information, periodically-transmitted information, urgently-transmitted information, or information on a handover.

13. A proxy apparatus in a wireless communication system, the proxy apparatus comprising:
a communication device configured to receive, from a base station, a packet including network information comprising information notifying whether a handover for one or more user equipments (UEs) connected to the base station has started, is being performed, or is terminated, and receive a plurality of packets from a plurality of servers; and
a controller configured to determine a transmission speed of one bearer including the plurality of packets based on the network information,
wherein the communication device is further configured to transmit, to the base station, data of one bearer based on the determined transmission speed, and
wherein the controller is further configured to control the transmission speed of the one bearer based on whether the handover for the one or more UEs connected to the base station has started, is being performed, or is terminated,
wherein the controller is further configured to:
decrease the transmission speed of the one bearer when the handover for the one or more UEs starts, and
terminate decreasing the transmission speed of the one bearer when the handover for the one or more UEs is terminated.

14. The proxy apparatus of claim 13, wherein the network information including a plurality of high layer connections is received in the one bearer, and
wherein the communication device is configured to receive, from the base station, a packet including the network information.

15. The proxy apparatus of claim 14, wherein the communication device is configured to transmit, to the base station, a first message for requesting the network information in the one bearer, and to transmit, to a network provider, a second message for requesting weighted point information.

16. The proxy apparatus of claim 14, wherein the communication device is configured to receive, from a network provider, information on a weighted point of each of the plurality of high layer connections included in the one bearer.

17. The proxy apparatus of claim 16, wherein the controller is configured to determine the transmission speed of the one bearer and the transmission speed of each of the plurality of high layer connections based on the network information and the information on the weighted point.

18. The proxy apparatus of claim 14, wherein the communication device is configured to receive, from the base station, a connection message for requesting a new high layer connection of at least one of UE.

19. The proxy apparatus of claim 18, wherein the communication device is configured to transmit a message for requesting information on a weighted point of the new high layer connection to a network provider when the new high layer connection is a connection included in the one bearer, and to receive, from the network provider, the information on the weighted point of the new high layer connection, and
the controller is configured to determine the transmission speed of the one bearer and the transmission speed of each of the plurality of high layer connections including the new high layer connection based on the network information, weighted point information, and the information on the weighted point for the new high layer connection.

20. The proxy apparatus of claim 18, wherein the communication device is configured to receive network information of another bearer from the base station when the new high layer connection is a connection included in the another bearer, and to receive, from a network provider, the information on a weighted point of each of the plurality of high layer connections including the new high layer connection within the another bearer, and
the controller is configured to determine a transmission speed of the another bearer and a transmission speed of each of the plurality of high layer connections including the new high layer connection based on the network information of the another bearer and the information on the weighted point for each of the plurality of high layer connections including the new high layer connection.

21. The proxy apparatus of claim 14, wherein the network information is included in a header of the packet and comprises one or more of information on a request type, identification information, or information for controlling a transmission speed.

22. The proxy apparatus of claim 21, wherein the identification information comprises one or more of a base station identifier or a bearer identifier.

23. The proxy apparatus of claim 21, wherein the information for controlling the transmission speed comprises one or more of a time taken while the packet is transmitted, a time taken until a message for requesting the network information arrives at the base station, the transmission speed of the one bearer, a maximum size of a buffer allocated to the one bearer, a maximum threshold value of the buffer, or a size of data stored in the buffer.

24. The proxy apparatus of claim 21, wherein the information on the request type comprises information notifying whether the network information is initially-transmitted information, periodically-transmitted information, urgently-transmitted information, or information on a handover.

* * * * *